US012344047B2

(12) United States Patent
Pamphile et al.

(10) Patent No.: US 12,344,047 B2
(45) Date of Patent: Jul. 1, 2025

(54) AUTOMATIC AIR TIRE TECHNOLOGY SYSTEM

(71) Applicants: William Pamphile, Malden, MA (US); Lande Pamphile, Malden, MA (US); Willande Pamphile, Malden, MA (US); William Pamphile, II, Malden, MA (US); Wilmayer Pamphile, Malden, MA (US)

(72) Inventors: William Pamphile, Malden, MA (US); Lande Pamphile, Malden, MA (US); Willande Pamphile, Malden, MA (US); William Pamphile, II, Malden, MA (US); Wilmayer Pamphile, Malden, MA (US)

( * ) Notice: Subject to any disclaimer, the term of this patent is extended or adjusted under 35 U.S.C. 154(b) by 160 days.

(21) Appl. No.: 18/299,443

(22) Filed: Apr. 12, 2023

(65) Prior Publication Data
US 2023/0294461 A1 Sep. 21, 2023

Related U.S. Application Data

(63) Continuation-in-part of application No. 17/084,498, filed on Oct. 29, 2020, now abandoned.

(51) Int. Cl.
*B60C 23/00* (2006.01)
(52) U.S. Cl.
CPC .. *B60C 23/00318* (2020.05); *B60C 23/00336* (2020.05); *B60C 23/00354* (2020.05); *B60C 23/004* (2013.01)
(58) Field of Classification Search
CPC ........ B60C 23/00318; B60C 23/00354; B60C 23/00336; B60C 23/004

USPC .......................................................... 152/415
See application file for complete search history.

(56) References Cited

U.S. PATENT DOCUMENTS 4,619,303 A * 10/1986 Bryan ................... B60C 23/001
152/416
4,678,017 A * 7/1987 Schultz ............. B60C 23/00363
137/859
4,685,501 A * 8/1987 Williams .......... B60C 23/00327
152/417

(Continued)

*Primary Examiner* — Luis A Martinez Borrero
(74) *Attorney, Agent, or Firm* — Lambert Shortell & Connaughton; David J. Connaughton, Jr.; Justin P. Tinger (57) ABSTRACT

A system and method provide automatic vehicle tire air pressure monitoring, warning, and maintenance for a vehicle. The vehicle includes a controller, wheel rims having tires coupled to wheel hubs, an air compressor configured to inflate the tires, a pressure sensor contained within each wheel rim on a vehicle for measuring air pressure within a tire located on each wheel rim, the compressor coupled to the tire rims for providing needed pressurized air, the compressor, an air pressure line connecting the compressor to the wheel rims, a driver display providing a warning to a driver, and a controller. The controller reads an air pressure value of the air pressure within each tire, determines whether the air pressure values within each tire, when one or more of the air pressure values are below the pre-determined value, activates the compressor to add air to each of the four tires needing the air pressure, and provides the driver a visual status of the air pressure values within in each of the tires and a visual status of the compressor state.

8 Claims, 7 Drawing Sheets

(56) References Cited

U.S. PATENT DOCUMENTS

| | | | | |
|---|---|---|---|---|
| 4,702,287 A * | 10/1987 | Higbie | G05D 16/2046 | 141/83 |
| 5,035,274 A * | 7/1991 | Kinnick | B60C 25/00 | 157/1.1 |
| 5,309,969 A * | 5/1994 | Mittal | B60C 23/00354 | 137/224.5 |
| 5,327,346 A * | 7/1994 | Goodell | B60C 23/00318 | 152/416 |
| 5,465,772 A * | 11/1995 | Sartor | B60C 23/0408 | 152/416 |
| 5,540,268 A * | 7/1996 | Mittal | B60C 23/00363 | 152/415 |
| 5,629,873 A * | 5/1997 | Mittal | B60C 23/0401 | 702/140 |
| 5,629,874 A * | 5/1997 | Mittal | B60C 23/00354 | 702/140 |
| 6,004,108 A * | 12/1999 | Hayes | B60S 5/046 | 417/231 |
| 6,230,556 B1 * | 5/2001 | Malinowski | B60C 23/00318 | 73/146.2 |
| 6,323,765 B1 * | 11/2001 | Horie | B60C 23/061 | 340/447 |
| 6,691,754 B1 * | 2/2004 | Moore | B60C 23/126 | 152/418 |
| 6,892,776 B2 * | 5/2005 | Skoff | B60C 23/00372 | 152/415 |
| 6,943,673 B2 * | 9/2005 | Skoff | B60C 23/04 | 73/146 |
| 6,976,391 B2 * | 12/2005 | Maquaire | B60C 23/0408 | 73/146 |
| 7,201,066 B1 * | 4/2007 | Stone | B60C 23/00336 | 73/861.52 |
| 7,530,379 B1 * | 5/2009 | Becker | B60C 23/00318 | 152/416 |
| 7,555,903 B2 * | 7/2009 | Tarasinski | F02B 37/24 | 152/416 |
| 7,975,731 B2 * | 7/2011 | Shultz | B60S 5/046 | 141/38 |
| 8,028,732 B1 * | 10/2011 | Ingram | B60C 23/00354 | 152/417 |
| 8,844,596 B2 * | 9/2014 | Medley | B60C 23/002 | 152/428 |
| 9,522,577 B2 * | 12/2016 | Dilisio | B60C 23/16 | |
| 9,636,954 B2 * | 5/2017 | Therber | B60C 23/00354 | |
| 10,086,660 B1 * | 10/2018 | Berkness | B60C 23/00318 | |
| 10,343,467 B1 * | 7/2019 | Dooley | B60C 23/00345 | |
| 10,442,254 B2 * | 10/2019 | Woodley | G07C 5/006 | |
| 10,493,808 B1 * | 12/2019 | McCauley | B60C 23/00354 | |
| 10,596,862 B1 * | 3/2020 | Cappello | B60C 23/00354 | |
| 10,596,863 B1 * | 3/2020 | Castriotta | B60C 23/00372 | |
| 10,596,864 B1 * | 3/2020 | Berkness | B60C 23/007 | |
| 10,766,316 B1 * | 9/2020 | Kulkarni | B60C 23/00354 | |
| 10,913,315 B1 * | 2/2021 | Del Olmo | B60C 23/00354 | |
| 10,953,706 B2 * | 3/2021 | Duncan | B60C 23/00345 | |
| 10,953,707 B2 * | 3/2021 | Duncan | B60C 23/00372 | |
| 11,001,109 B1 * | 5/2021 | Del Olmo | B60C 23/0496 | |
| 11,872,852 B2 * | 1/2024 | Henry | B60C 23/00354 | |
| 2001/0026218 A1 * | 10/2001 | Schofield | B60Q 1/50 | 340/442 |
| 2003/0216845 A1 * | 11/2003 | Williston | B60C 23/0408 | 340/442 |
| 2004/0055291 A1 * | 3/2004 | Meydieu | B60C 23/00318 | 60/468 |
| 2004/0173296 A1 * | 9/2004 | White | B60C 23/00372 | 152/417 |
| 2005/0194080 A1 * | 9/2005 | White | B60C 23/00318 | 152/417 |
| 2005/0274442 A1 * | 12/2005 | Huang | B60C 23/0408 | 152/415 |
| 2006/0001534 A1 * | 1/2006 | Shida | B60C 23/0408 | 73/146 |
| 2006/0102268 A1 * | 5/2006 | Loewe | B60C 23/004 | 152/415 |
| 2006/0179929 A1 * | 8/2006 | Becker | B60C 23/00363 | 73/146 |
| 2006/0180256 A1 * | 8/2006 | Mittal | B60C 23/004 | 152/416 |
| 2006/0238323 A1 * | 10/2006 | Watabe | B60C 23/0416 | 340/447 |
| 2006/0276990 A1 * | 12/2006 | Abramovitch | B60C 23/0408 | 702/138 |
| 2006/0278314 A1 * | 12/2006 | Skoff | B60C 23/002 | 152/415 |
| 2007/0068240 A1 * | 3/2007 | Watabe | B60C 23/0454 | 73/146.5 |
| 2008/0190535 A1 * | 8/2008 | Concu | B60C 23/00318 | 152/416 |
| 2009/0032158 A1 * | 2/2009 | Rudolf | B60C 23/00305 | 152/415 |
| 2009/0058626 A1 * | 3/2009 | Watabe | B60C 23/045 | 340/447 |
| 2009/0084481 A1 * | 4/2009 | Kalavitz | B60C 23/0039 | 152/417 |
| 2009/0151441 A1 * | 6/2009 | Yim | B60C 99/003 | 73/146.2 |
| 2009/0241655 A1 * | 10/2009 | Ingram | B60C 23/00318 | 73/146.3 |
| 2010/0024939 A1 * | 2/2010 | Kusunoki | B60C 23/00318 | 152/416 |
| 2010/0038004 A1 * | 2/2010 | Saadat | B60C 23/00363 | 152/427 |
| 2010/0147387 A1 * | 6/2010 | Medley | F16K 27/003 | 137/224 |
| 2010/0212798 A1 * | 8/2010 | Bothe, Jr. | B60S 5/046 | 152/415 |
| 2011/0175716 A1 * | 7/2011 | Medley | B60C 23/00363 | 152/427 |
| 2011/0203710 A1 * | 8/2011 | Hinojosa, Jr. | B60C 23/10 | 152/419 |
| 2011/0272055 A1 * | 11/2011 | Lepera | B60C 29/064 | 141/1 |
| 2011/0308637 A1 * | 12/2011 | Tsiberidis | B60C 23/00354 | 137/223 |
| 2012/0218095 A1 * | 8/2012 | Zhou | B60C 29/064 | 340/447 |
| 2012/0305126 A1 * | 12/2012 | Merrill | B60C 23/00363 | 141/38 |
| 2013/0167999 A1 * | 7/2013 | Nakatani | B60C 23/04 | 152/450 |
| 2013/0199685 A1 * | 8/2013 | Nelson | B60C 23/00363 | 152/415 |
| 2013/0228258 A1 * | 9/2013 | Knapke | B60C 23/00318 | 152/415 |
| 2013/0276902 A1 * | 10/2013 | Medley | B60C 23/00372 | 137/12 |
| 2013/0282232 A1 * | 10/2013 | Medley | B60C 23/002 | 152/427 |
| 2014/0019035 A1 * | 1/2014 | Fink | G01M 17/013 | 701/300 |
| 2014/0096881 A1 * | 4/2014 | Loewe | B60C 23/133 | 152/415 |
| 2014/0261939 A1 * | 9/2014 | Therber | B60C 23/00372 | 152/415 |
| 2015/0059919 A1 * | 3/2015 | Stadele | B60C 23/00363 | 152/416 |
| 2015/0096655 A1 * | 4/2015 | Koulinitch | B60C 23/00318 | 152/416 |
| 2015/0101702 A1 * | 4/2015 | Dean | B60C 23/00372 | 141/4 |
| 2015/0165847 A1 * | 6/2015 | Sherman | B60C 23/00363 | 152/427 |
| 2015/0174972 A1 * | 6/2015 | Zhou | B60C 23/00345 | 340/447 |
| 2015/0231937 A1 * | 8/2015 | Holdrich | B60C 23/00372 | 152/417 |
| 2015/0239309 A1 * | 8/2015 | Root | B60C 23/004 | 152/419 |

(56) References Cited

U.S. PATENT DOCUMENTS

| | | | |
|---|---|---|---|
| 2015/0273958 A1* | 10/2015 | Stoychev | B60C 23/00363 |
| | | | 152/415 |
| 2015/0290986 A1* | 10/2015 | Tsiberidis | F16J 15/002 |
| | | | 152/417 |
| 2015/0360522 A1* | 12/2015 | Dieckmann | B60C 23/00318 |
| | | | 152/417 |
| 2015/0375581 A1* | 12/2015 | Serbu | B60C 23/041 |
| | | | 73/146.8 |
| 2016/0009148 A1* | 1/2016 | Berkness | B60C 23/00318 |
| | | | 152/417 |
| 2016/0052351 A1* | 2/2016 | Dilisio | B60C 23/00372 |
| | | | 137/224 |
| 2016/0139003 A1* | 5/2016 | Posselius | B60C 23/066 |
| | | | 700/276 |
| 2016/0144675 A1* | 5/2016 | Knepple | B60C 23/001 |
| | | | 137/12 |
| 2016/0152100 A1* | 6/2016 | Berkness | B60B 27/04 |
| | | | 301/6.5 |
| 2016/0167456 A1* | 6/2016 | Mozingo | B60C 23/00345 |
| | | | 137/12 |
| 2016/0167458 A1* | 6/2016 | Läänemets | B60C 23/00354 |
| | | | 251/12 |
| 2016/0214441 A1* | 7/2016 | Hoeldrich | B60C 23/02 |
| 2016/0229233 A1* | 8/2016 | Edwards | B60S 5/046 |
| 2016/0281854 A1* | 9/2016 | Tsiberidis | F16J 15/3232 |
| 2016/0347131 A1* | 12/2016 | Tsiberidis | F16C 41/005 |
| 2016/0361957 A1* | 12/2016 | Burke | B60C 23/00381 |
| 2016/0368329 A1* | 12/2016 | Vidal | B60C 23/0039 |
| 2016/0375730 A1* | 12/2016 | Kona | B60C 23/00372 |
| | | | 141/4 |
| 2017/0080761 A1* | 3/2017 | King | B60C 23/00372 |
| 2017/0087944 A1* | 3/2017 | King | B60C 23/00354 |
| 2017/0113498 A1* | 4/2017 | King | B60C 23/0408 |
| 2017/0114912 A1* | 4/2017 | Staedele | B60C 23/00354 |
| 2017/0129498 A1* | 5/2017 | Singh | B60C 23/00 |
| 2017/0246921 A1* | 8/2017 | Hoeldrich | B60C 23/00354 |
| 2017/0246922 A1* | 8/2017 | Tsiberidou | B60C 23/00363 |
| 2017/0299077 A1* | 10/2017 | Jabcon | B60C 23/00354 |
| 2017/0313318 A1* | 11/2017 | Heindl | B60C 23/002 |
| 2018/0022168 A1* | 1/2018 | Dunning | B60C 23/00354 |
| | | | 152/417 |
| 2018/0056732 A1* | 3/2018 | Ingram | B60C 23/00318 |
| 2018/0056733 A1* | 3/2018 | Ingram | B60C 23/003 |
| 2018/0162182 A1* | 6/2018 | Coombs | B60C 23/00372 |
| 2018/0170124 A1* | 6/2018 | Dodu | B60C 23/00354 |
| 2018/0170125 A1* | 6/2018 | Woodley | B60C 23/00318 |
| 2018/0178598 A1* | 6/2018 | Woodley | G07C 5/006 |
| 2018/0186197 A1* | 7/2018 | Tsiberidou | B29C 73/166 |
| 2018/0186198 A1* | 7/2018 | Zhou | B60C 23/00345 |
| 2018/0208000 A1* | 7/2018 | Gilardino | B60C 23/00309 |
| 2018/0244281 A1* | 8/2018 | Jankowski | B60W 10/18 |
| 2018/0297422 A1* | 10/2018 | Ciovnicu | B60C 23/00318 |
| 2018/0304697 A1* | 10/2018 | Woodley | B60C 23/00354 |
| 2018/0304699 A1* | 10/2018 | Castriotta | B60C 23/00354 |
| 2018/0312018 A1* | 11/2018 | Wilson | B60S 5/046 |
| 2018/0326799 A1* | 11/2018 | Benevelli | B60C 5/02 |
| 2018/0345740 A1* | 12/2018 | Vitolo | B60C 23/00345 |
| 2018/0345741 A1* | 12/2018 | Vitolo | B60C 23/00354 |
| 2018/0356798 A1* | 12/2018 | Ciovnicu | B60C 23/00372 |
| 2019/0023091 A1* | 1/2019 | Spindler | F04C 18/22 |
| 2019/0030967 A1* | 1/2019 | Araki | B60C 19/00 |
| 2019/0047334 A1* | 2/2019 | Chidlow | B60C 23/004 |
| 2019/0054779 A1* | 2/2019 | Benevelli | B60C 23/00354 |
| 2019/0210413 A1* | 7/2019 | Mancinelli | B60C 23/00354 |
| 2019/0230615 A1* | 7/2019 | Werner | B60C 23/0408 |
| 2019/0271407 A1* | 9/2019 | Scopesi | F16K 31/1223 |
| 2019/0283512 A1* | 9/2019 | Blessing | B60C 23/00354 |
| 2019/0359014 A1* | 11/2019 | Rethmel | B60B 21/10 |
| 2019/0366783 A1* | 12/2019 | Balistreri | B60C 23/00318 |
| 2019/0381840 A1* | 12/2019 | Hennig | B60C 23/00305 |
| 2020/0031334 A1* | 1/2020 | Woodley | B60T 8/1761 |
| 2020/0062048 A1* | 2/2020 | Butler | B60L 50/60 |
| 2020/0070450 A1* | 3/2020 | Tsiberidis | B60C 23/00363 |
| 2020/0079158 A1* | 3/2020 | Tsiberidis | B60C 23/137 |
| 2020/0134939 A1* | 4/2020 | Schell | G07C 5/008 |
| 2020/0139772 A1* | 5/2020 | Vogelpohl | B60C 23/00363 |
| 2020/0189533 A1* | 6/2020 | Lin | B60C 23/10 |
| 2020/0258491 A1* | 8/2020 | Jang | G10K 11/16 |
| 2020/0338937 A1* | 10/2020 | Morris | B60C 23/00354 |
| 2020/0346499 A1* | 11/2020 | Tritschler | B60C 23/00327 |
| 2021/0070116 A1* | 3/2021 | Sodermanns | B60C 23/00372 |
| 2021/0170811 A1* | 6/2021 | Sodermanns | B60C 23/00372 |
| 2022/0134811 A1* | 5/2022 | Pamphile | B60C 23/001 |
| | | | 701/36 |
| 2022/0227186 A1* | 7/2022 | Tritschler | B60C 23/00372 |
| 2022/0227187 A1* | 7/2022 | Schulze Selting | B60C 23/00354 |
| 2022/0234397 A1* | 7/2022 | Coombs | B60C 23/00336 |
| 2023/0092710 A1* | 3/2023 | Dunst | B60C 23/00354 |
| | | | 152/416 |
| 2023/0173854 A1* | 6/2023 | Ahmed | F16K 17/30 |
| | | | 152/415 |
| 2023/0294461 A1* | 9/2023 | Pamphile | G01L 17/00 |
| | | | 152/415 |
| 2023/0382165 A1* | 11/2023 | Hennig | B60C 23/00354 |
| 2024/0326522 A1* | 10/2024 | Tomlinson | B60C 23/00363 |
| 2025/0058592 A1* | 2/2025 | Coombs | B60C 23/00318 |

* cited by examiner

AUTOMATIC AIR TIRE TECHNOLOGY SYSTEM

CROSS REFERENCE TO RELATED APPLICATIONS

This application is a Continuation-In-Part of application Ser. No. 17/084,498 filed on Oct. 29, 2020, now abandoned, which is incorporated herein by reference in its entirety.

TECHNICAL FIELD

This application relates in general to a system and method for providing a vehicle safety device, and more specifically, to a system and method for providing automatic vehicle tire air pressure monitoring, warning, and maintenance.

BACKGROUND

Driving a vehicle when one or more of the tires goes flat presents a significant safety risk to the occupants of the vehicle if driving for any significant distance and speed. Driving a vehicle when one or more of the tires goes flat typically quickly damages the tire, the rim, or both even if the vehicle does not suffer any other damage. Many air leaks that cause a tire to lose its air pressure are small in size and a slow rate of pressure loss. As such, it may be possible in some circumstances to continuously add air pressure to inflate a tire back to a safe pressure level and then maintain the tire pressure for a short time to permit the vehicle to be driven to a safe location and obtain service. At the same time, a driver of the vehicle needs to know when a tire is losing pressure and whether a safe pressure level may be maintained.

Therefore, a need exists for a system and method for providing automatic vehicle tire air pressure monitoring, warning, and maintenance. The present invention, therefore, attempts to address the deficiencies and limitations of existing systems on vehicles according to the principles and example embodiments disclosed herein.

SUMMARY

In accordance with the present invention, the above and other problems are solved by providing a system and method for automatic vehicle tire air pressure monitoring, warning, and maintenance according to the principles and example embodiments disclosed herein.

In one embodiment, the present invention is a system for providing automatic vehicle tire air pressure monitoring, warning, and maintenance. The system includes a controller, four wheel rims having four tires coupled to four wheel hubs, an air compressor configured to inflate each of the four tires, a pressure sensor contained within each wheel rim on a vehicle for measuring air pressure within a tire locates on each wheel rim, the compressor coupled to each of the four tire rims for providing pressurized air to each tire, the compressor having a standby state and an operating state, an air pressure line separately connecting the compressor to an air input valve in each of the four wheel rims, a driver display within the vehicle for providing warning to a driver, and a controller.

In another aspect of the present disclosure, the controller includes a memory having instructions stored thereon and a processor configured to execute the instructions on the memory to cause the controller to read an air pressure value corresponding to the air pressure within each tire, determine with the air pressure value within each tire is below a predetermined value, when one or more of the air pressure values are below the pre-determined value, activate the compressor to separately add air to each of the four tires having the air pressure values below the pre-determined value, and provide the driver a visual status of the air pressure values within in each of the tires and a visual status of the compressor state.

In another aspect of the present disclosure, the system further comprises one or more air feeders coupled to one or more of the air pressure lines configured to connect to an external air supply assembly for inflating tires and other inflatable items not attached to the vehicle.

In another aspect of the present disclosure, the external air supply assembly comprises an air outlet coupled to an air hose and an air pressure display, the external air supply assembly is removably connected to one of the air feeders to obtain pressurized air from the compressor.

In another aspect of the present disclosure, the driver display provides a visual warning to the driver when one or more of the air pressure values measured for each of the four tires.

In another aspect of the present disclosure, the driver display is further configured to provide an auditory warning with the visual warning to the driver when one or more of the air pressure values measured for each of the four tires indicating which of the four tires is in need of additional air pressure.

In another aspect of the present disclosure, each of the tire rims comprise a wheel hub sensor for detecting a physical connection between the tire rim and the corresponding wheel hub.

In another aspect of the present disclosure, the controller is further configured to execute the instructions to read the wheel hub sensors and when the controller detects the wheel hub sensors indicate that a wheel hub is separating from the corresponding wheel rim, provide the driver with a wheel rim separation warning indicating detection of one or more wheel hubs are separating from the corresponding wheel rim.

In another aspect of the present disclosure, the wheel rim separation warning includes a visual separation warning and an auditory separation warning.

In another embodiment, the present invention is a method for providing automatic vehicle tire air pressure monitoring, warning, and maintenance to a vehicle. The vehicle includes a controller, four wheel rims having four tires coupled to four wheel hubs, an air compressor configured to inflate each of the four tires, an air pressure line separately connecting the compressor to an air input valve in each of the four wheel rims; and a driver display within the vehicle for providing warning to a driver. The method reads an air pressure value corresponding to the air pressure within each tire, determine with the air pressure value within each tire is below a predetermined value, activates the compressor to separately add air to each of the four tires having the air pressure values below the pre-determined value when one or more of the air pressure values are below the pre-determined value, and provides the driver a visual status of the air pressure values within in each of the tires and a visual status of the compressor state.

In another aspect of the present disclosure, the method further reads the wheel hub sensors and provides the driver with a wheel rim separation warning indicating detection of one or more wheel hubs are separating from the corresponding wheel rim when the controller detects the wheel hub sensors indicate that a wheel hub is separating from the corresponding wheel rim.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout.

DETAILED DESCRIPTION

This application relates in general to a system and method for providing a vehicle safety device, and more specifically, to system and method for providing automatic vehicle tire air pressure monitoring, warning, and maintenance according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly."

The terms "customer," and "user" refer to an entity, e.g. a human, using the a vehicle including a system and method for providing automatic vehicle tire air pressure monitoring, warning, and maintenance associated with the invention. The term user herein refers to one or more users.

The term "invention" or "present invention" refers to the invention being applied for via the patent application with the title "Automatic Air Tire Technology System." Invention may be used interchangeably with tire pressurizer.

Figure 1:
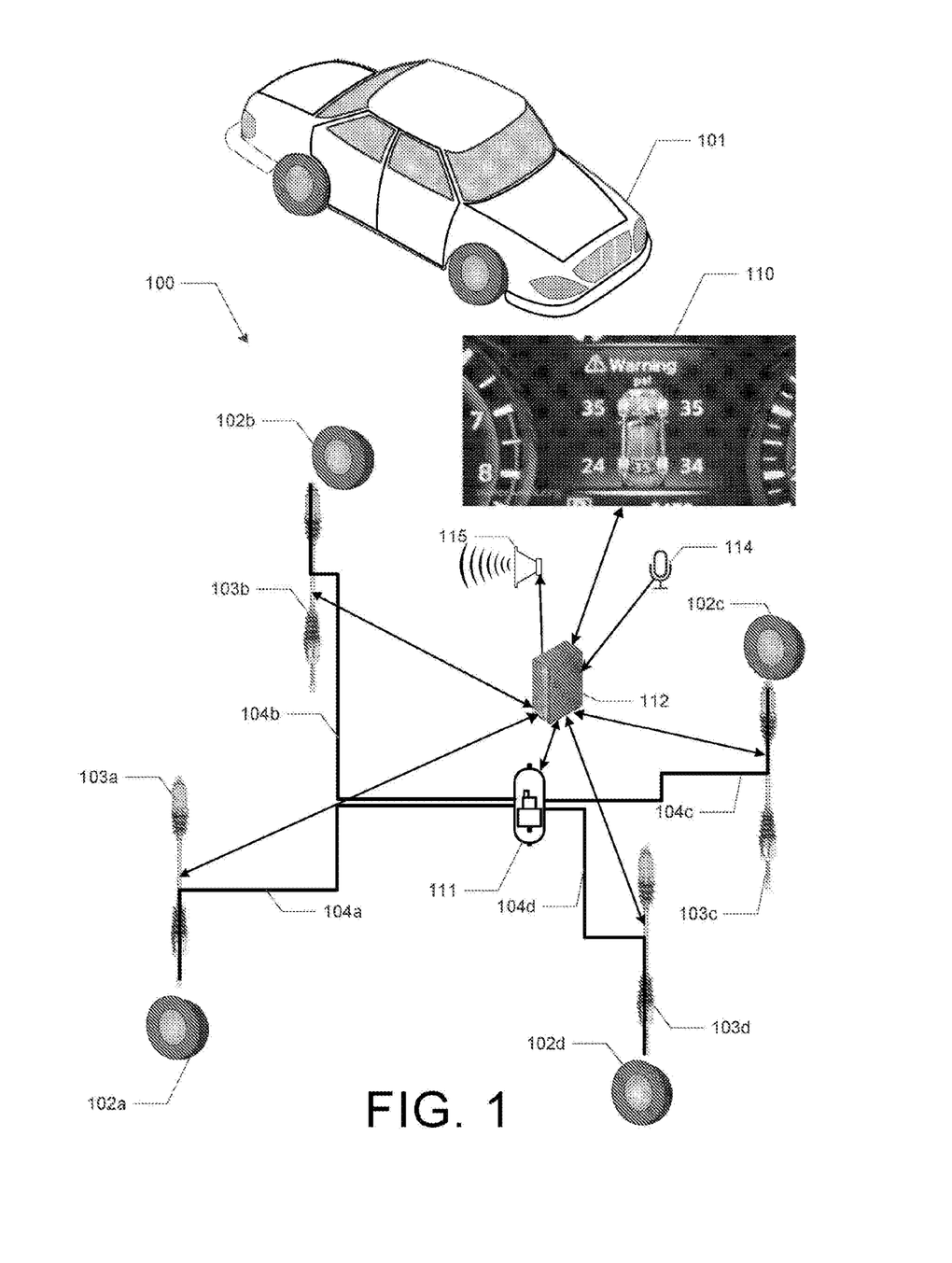
FIG. 1 illustrates an example embodiment of a system and method for providing automatic vehicle tire air pressure monitoring, warning, and maintenance according to the preset invention.

In general, the present disclosure relates to a system and method providing automatic vehicle tire air pressure monitoring, warning, and maintenance according to the present invention. To better understand the present invention, FIG. 1 illustrates an example embodiment of a system and method for providing automatic vehicle tire air pressure monitoring, warning, and maintenance according to the preset invention. A typical vehicle 101 may include a system that monitors the air pressure in each of the vehicle's four tires 102 *a-d*. A dashboard display 110 may present the current air pressure levels in each of the four tires 102 *a-d* as well as any warnings associated with the air pressure levels within the tires 102 *a-d*.

A system according to the present invention may be designed to feed air when a tire 102 *a* is under-inflated. The system 100 may be designed to feed tire air automatically in tires on a variety of vehicles, for example, automobiles, trucks, and airplanes. The system 100 can read the PSI level of air pressure in the tires 102 *a-d* and if losing air, the system may respond to feed the particular tire having a drop in air pressure a specified amount of air needed to increase and maintain a safe pressure.

If the tire has a hole of less than once (1) inch, the system typically can continue to feed the tire 102 *a* until the tire is repaired. A tire sensor 103 *a-d* on each of the four tires 102 *a-d* can detect which tire is losing air and notify an on-board compressor 111. The system 100 continuously monitors the tire PSI level and automatically feeds the tire air using an air pressure line 104 *a-d* from the compressor to the tires 102 *a-d*.

The system 100 can feed air to the tires 102 *a-d* while driving without requiring the driver to immediately pull over and park the vehicle 101. The compressor 111 can feed each of the tires 102 *a-d* via its own air pressure line 104 *a-d* one by one or to all four (4) tires at once as needed. Air input valves 105 *a-d* are located within the tire rims 112 to supply the air to the tires 102 *a-d*. Because it is the tires' air pressure that supports the weight of the vehicle 101, the Automatic Air Tire Technology System 100 monitors the air pressure continuously to maintain the PSI level to the specified amount to ensure a smooth drive. Because the air tire pressure can change rapidly due to bad weather and inflation pressure can fluctuate with changes in temperature, the Automatic Air Tire Technology System 100 may also monitor the air tire pressure and temperature, and take conditions into account as the temperature changes.

The air compressor 111 may typically be located on a side of the engine as it obtains its energy to operate from the engine while it is running. The compressor 111 may be powered electrically; obtaining electrical power from an alternator and associated charging system. The compressor 111 also may be connected by a fan belt to the engine's flywheel along with other components such as the alternator, water and power steering pumps, and air conditioner compressor to obtain its operating power.

Within the vehicle 100, a driver display 110 provides a visual representation of the state of the tires 102 *a-d* on the dashboard for easy viewing by a driver. The driver display 110 may provide warning messages from the system 100 to indicate that a tire air pressure is low and to indicate that the system 100 is providing air to one or more tires. The system 100 also may provide auditory warnings to the driver using a speaker 115 inside the vehicle. These auditory warnings may play through its own speaker system or through a stereo system in most vehicles. If a stereo system is used, the auditory warnings will play the warnings even when the stereo system is turned off by a driver.

A voice activated system in the dashboard will indicate to the driver that a tire pressure is lows and show the tire in the dashboard monitor while the system is feeding the tire automatically. The voice activated features may accept input commands from a driver and may provide a speech-based warning system that outputs synthesized or recorded warning messages.

In additional, the Automatic Air Tire Technology System 100 is designed with a tire system controller 112 that receives the pressure input signals from the tires, commands the compressor 112 to activate, and provides additional air pressure to any one or more tires 102 *a-d*. The tire system controller 112 also generates data for display to the driver on the driver display 110 and generates all warning messages both visual and auditory.

The tire system controller 112 also may receive input tire rim status signals from sensors associated with each of the wheels and tires 102 *a-d*. The input tire rim status signals are provided to the tire system controller 112 to detect whether or not the rims that are part of the tires 102 *a-d* are loosening from the wheel hubs. When a tire rim is loosening, the tire sensor 103 *a-d* sends an emergency signal message to the tire system controller 112 that generates warning messages that are sent to the driver using the driver display 110 on the dashboard as well as any associated auditory warnings. The driver display 110 may show which of the tires 102 *a-d* needs attention. The driver may respond to these warnings by pulling over and using a tire lug wrench to tighten the tire lug nuts. Once the tire is tightened, the system controller 112 automatically resets and continues to monitor the condition of the tires 102 *a-d* and their corresponding tire rims.

In other embodiments, the system 100 may include light sources such as LED lights outside around the tire area to provide light to see the tire and rim while repairing a problem at night or in bad weather. The driver may provide input to the system 100 via an input button on the dashboard or a virtual button if the display device is a touch screen device capable of accepting inputs from the driver. The driver may provide input to the system 100 to inform the system 100 when a driver has initiated and/or completed changing a tire or otherwise repaired a tire or tire rim. The driver may also use the input button to indicate that the driver acknowledges the warning from the tire system controller 112 and intends to continue to drive the vehicle 101 at the present time. The driver may turn on and off LED lights over the tires when changing a tire by providing input commands to the tire system controller 112 as described above.

Finally, the system may, in some embodiments comprise two additional air feeders (shown in FIG. 3) outside in the front left side and right side of the car that are connected to the compressor 111. An air hose with a tire stem mating connector may be connected to these additional air feeders to provide a source of pressurized air. The air hoses may permit a driver to assist other vehicles in need of air because of a flat tire. Of course, the compressor 111 may provide a driver with air to fill other items including inflatable balls and related sporting equipment, air mattresses and related camping equipment, and any other item that individuals may need to fill with air for use.

Figure 2:
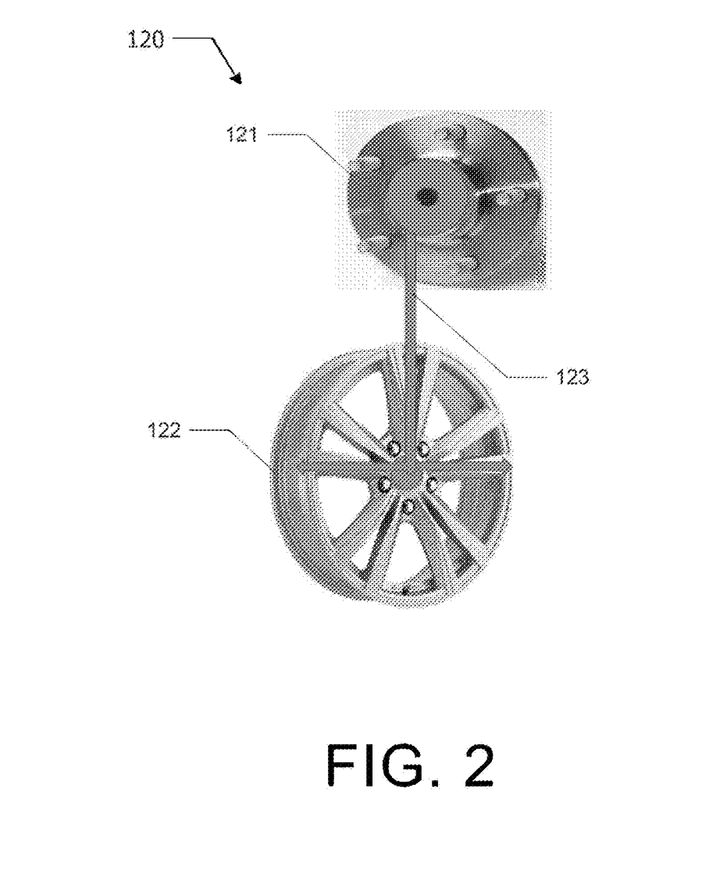
FIG. 2 illustrates an example embodiment of a tire rim that is part of a system and method providing automatic vehicle tire air pressure monitoring, warning, and maintenance according to the present invention.

FIG. 2 illustrates another example embodiment of a tire rim that is part of a system and method for providing automatic vehicle tire air pressure monitoring, warning, and maintenance according to the present invention. FIG. 2 shows the tire rim 112 being connected to the wheel hub 122 having a sensor to detect the loosening of the lug nuts as described above. The surface area of the tire rim 112 forming a gap with the wheel hub 112, even briefly and intermittently may be detected by the system to generate the warning signals to the driver as disclosed above in reference to FIG. 1.

Figure 3:
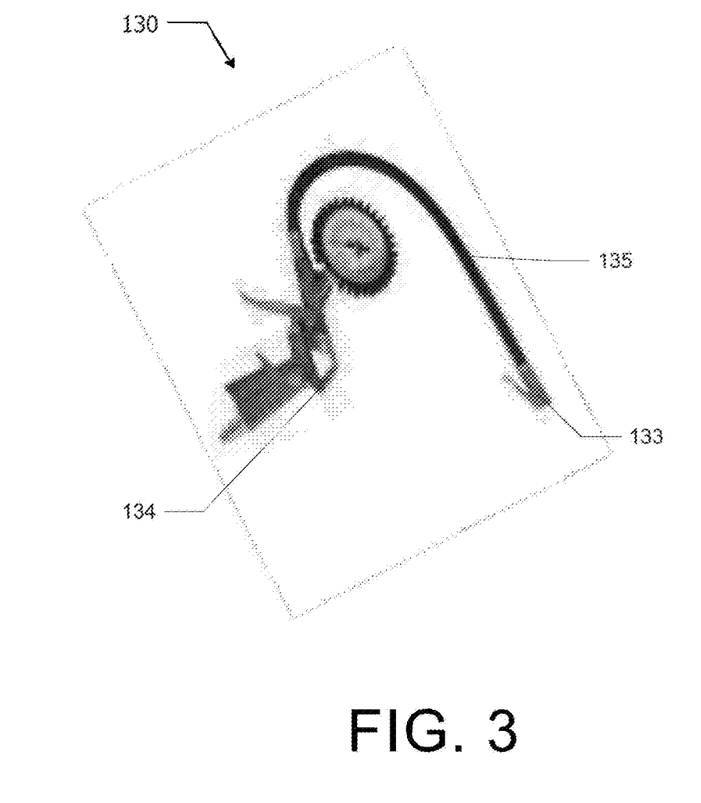
FIG. 3 illustrates an example embodiment of an external tire air supply that is part of a system and method providing automatic vehicle tire air pressure monitoring, warning, and maintenance according to the present invention.

FIG. 3 illustrates an example embodiment of an external tire air supply assembly that is part of a system and method providing automatic vehicle tire air pressure monitoring, warning, and maintenance according to the present invention. An air outlet 133 and an air pressure display 134 are connected by an air hose 135 to the system at a wheel hub 122. This connection is provided as an external source of air pressure that may supply air to other vehicles and other items that require inflation. The air hose 135 and air pressure display 134 couple to an external air connection to the system about one or more wheels of the vehicle. The air supply assembly 130 may be stored within the vehicle, such as in a trunk or similar storage area, and be attached when needed.

Figure 4:
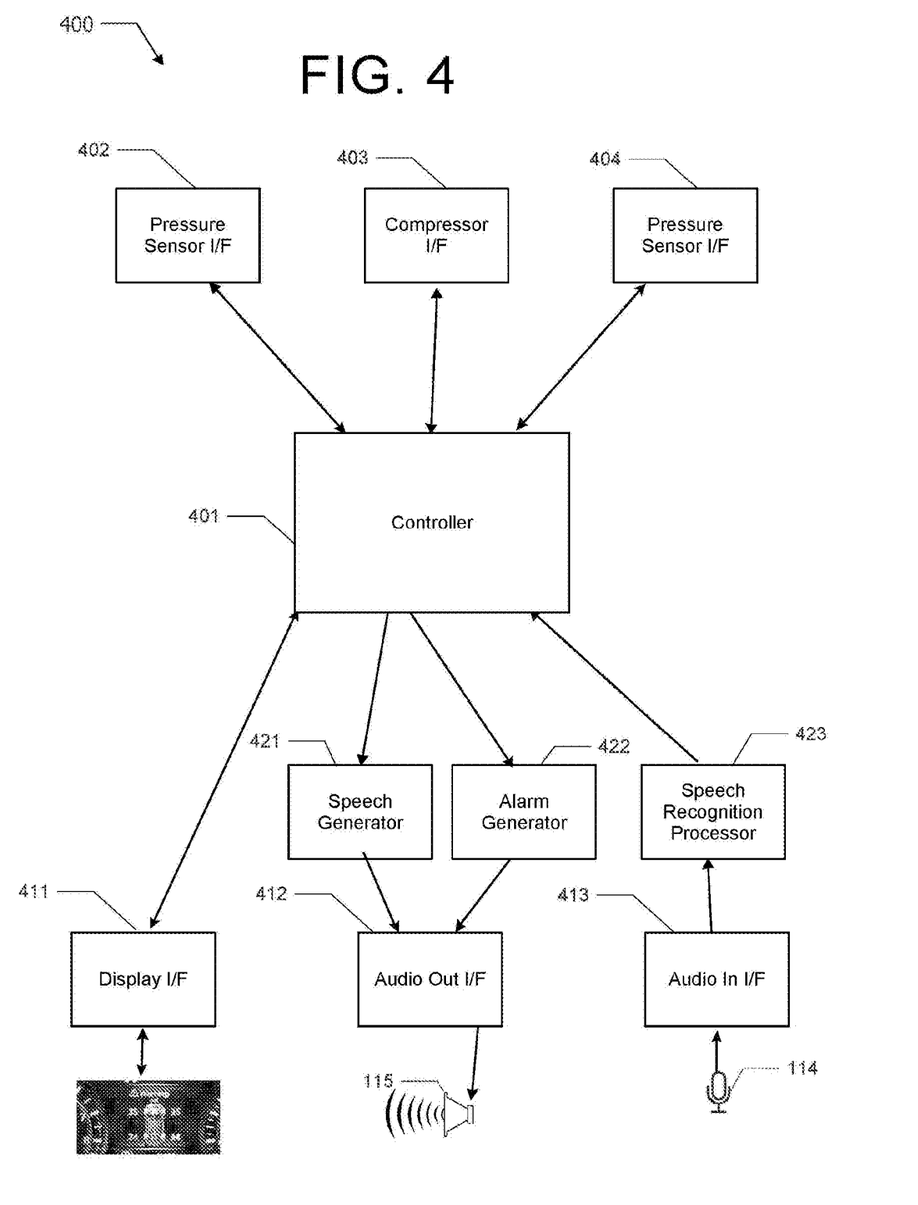
FIG. 4 illustrates a set of processing components utilized to implement a system and method providing automatic vehicle tire air pressure monitoring, warning, and maintenance according to the present invention.

FIG. 4 illustrates a set of processing components utilized to implement a system and method for providing automatic vehicle tire air pressure monitoring, warning, and maintenance according to the present invention. An embodiment of a tire system controller 400 is shown in FIG. 4. The tire system controller 400 comprises a controller 401, a pressure sensor interface 402, a compressor interface 403, a tire rim sensors 404, a display device interface 411, an audio out interface 412 and an audio in interface 413. The audio out interface 412 generates audio signals for the speaker 115 from a speech generator 421 and an alarm generator 442. The audio in interface 412 is connected to a microphone 114 and generates a digital representation of the audio input for submission to and processing by a speech recognition processor 423.

The controller 401 is a processing module that performs the functionality of the tire system controller 112 as disclosed herein. The controller 401 receives signals from the tire pressure sensors 103 a-d and corresponding tire rim sensors 404 via the pressure sensor interface 402 to determine whether an emergency condition exists that requires attention. The controller 401 provides commands to the compressor 111 via the compressor interface 403 to instruct the compressor 111 to activate and shut down as well as which of the tires is to be provided air pressure.

The controller 401 also interacts with the driver using the display device interface 411 to send visual data to the display, using the speech generator 421 and alarm generator 422 to generate auditory messages and warnings to the speaker 115 via the audio out interface 412, and using the speech recognition processor 423 to receive voice commands from the microphone 114 via the audio in interface 413.

All of any operating rules associated with emergency conditions are processed by the controller 401 that correspond to warnings, messages, and instructions to be performed by the system 100. The controller 401 also may communicate with other computing devices within the vehicle 101 as needed to provide data, warnings, and related commands that the vehicle might respond to and take action beyond just the tire and rim action described herein.

The pressure sensor interface 402 receives input signals from the pressure sensors 103 a-d and generates data values corresponding to the measured air pressure in each of the tires 102 a-d. These input signals from the pressure sensors 103 a-d may be provided as analog or digital signals depending upon the operation of the particular sensors 103 a-d and generate air pressure value and emergency conditions detected at any of the four tires 102 a-d. These air pressure values and emergency conditions are transmitted to the controller 401 to determine the state of the tires 102 a-d, to provide any instructions to the compressor, and to provide warnings and data to the driver.

The compressor interface 403 provides one or more connections to attach an external air hose and pressure display assembly 130 as disclosed above in reference to FIG. 3. The assembly 130 provides an external source of pressurized air to other vehicles and inflatable devices.

The tire rim sensor 404 are connected to the wheel hub 122 to generate input signals detecting a loosening of the tire rim 112 from wheel hub 122. These input signals from the tire rim sensors 402 may be provided as analog or digital signals depending upon the operation of the particular sensors 402 and generate rim tightness values and emergency conditions detected at any of the four tires 102 a-d. These rim tightness values and emergency conditions are transmitted to the controller 401 to determine the state of the tires 102 a-d, to provide any instructions to the compressor, and to provide warnings and data to the driver.

The display device interface 411 provides signal connections between the driver display 110 and the controller 401. The display device interface 411 sends out data for display on a display device and signals to illuminate any other lights and LEDs that provide warnings to the driver. The display device interface 411 also receives any input signals from the driver, via a touch screen device or one or more input switches and buttons. These signals are received and identified with the corresponding values to be sent to the controller 401 to provide the driver's input for use.

The audio out interface 412 generates audio signals for the speaker 115 based upon data from the speech generator 421 and alarm generator 422. These input signals may be analog and digital in form. The audio out interface 412 outputs the audio data that may be received and played by the speaker 115. The audio out data may be an analog signal provided directly to a speaker via a sound driver and a digital representation of the out audio data that is sent to the speaker. The digital representation of the output audio data may be passed to the speaker 115 via wire(s), a wireless connection such as Bluetooth™ or similar communication protocols and fiber optic connections typically used to communicate audio data to speaker systems.

The speech generator 421 receives output data in the form of text messages that are to be used to generate audio speech messages in a particular user's language. The speech generator 421 may translate the text from one language to another or use prestored versions of the output audio corresponding to known messages and warnings to generate the output speech audio that is passed to the audio out interface 412 to be combined with any alarm messages from the alarm generator 422.

The alarm generator 422 receives output data in the form of messages that are to be used to generate audio alarms and signals. The alarm generator typically generates signals such as alarms, sirens, and the like. Any speech-based alarms may be generated in the speech generator 421. The alarms pass as data to the audio out interface 412 to be combined with any speech messages from the speech generator 421.

The audio in interface 412 is connected to a microphone 114 and generates a digital representation of the audio input for submission to and processing by a speech recognition processor 423. The microphone 114 may generate an audio signal that is either an analog signal or a digital representation of the audio signal. The audio in interface 412 processes the audio signal that may be accepted and used by the speech recognition processor 423.

The speech recognition processor 423 receives audio input data from the audio in interface 412 to generate text commands and data to provide instructions for the tire system controller 112 from a driver. The speech recognition processor 423 processes the data into a particular language that may be recognized and passes the commands to the controller 401 for action. The speech recognition processor 423 may be programmed to recognize words and commands in any number of different languages and having the system 100 set a user language to one that is expected to be used may lessen the processing needed to recognize and generate the commands from the audio in data.

Figure 5:
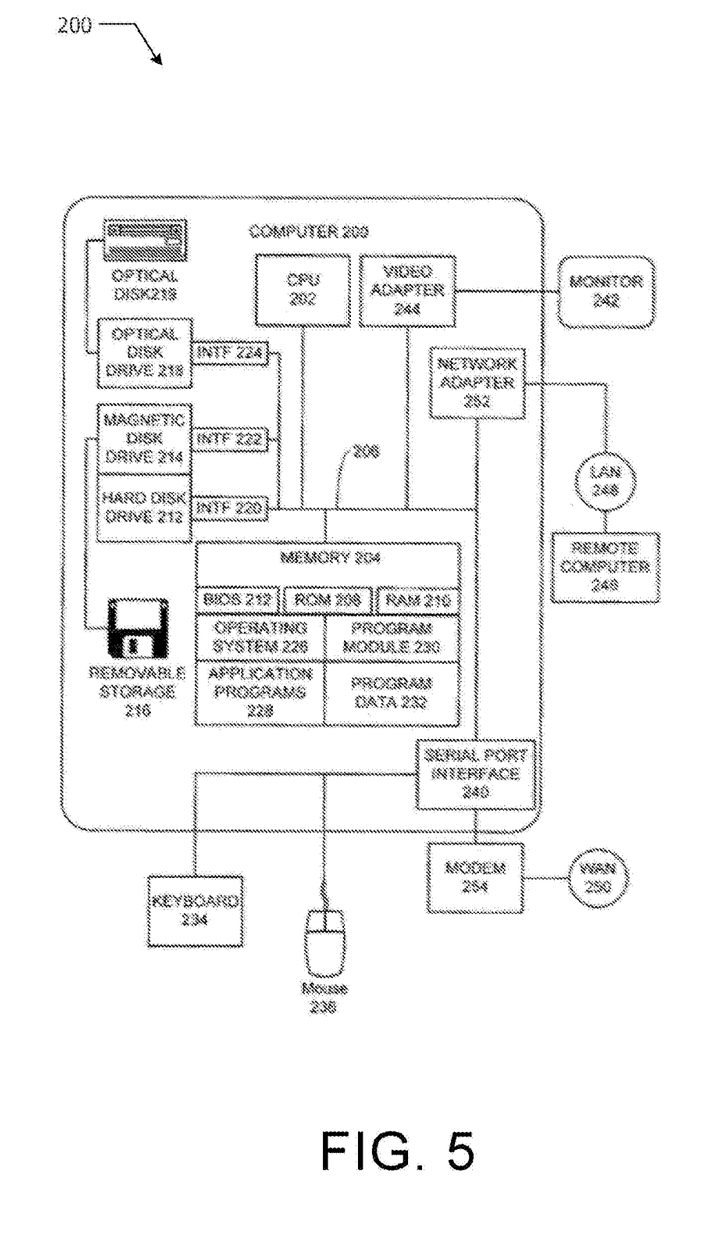
FIG. 5 illustrates an example embodiment of a digital processing system to implement the system and method for providing automatic vehicle tire air pressure monitoring, warning, and maintenance according to the present invention according to the present invention.

FIG. 5 illustrates an example embodiment of a digital processing system to implement the system and method for providing automatic vehicle tire air pressure monitoring, warning, and maintenance according to the present invention. The tire system controller 112 may be implemented as a digital processing system 200 that contains software in the form of executable instructions stored within memory of the tire system controller 112. When the CPU 202 executes these instructions in memory, the tire system controller 112 performs the functions of the system 100 as described herein.

The CPU 202 is coupled to the system bus 204. The CPU 202 may be a general-purpose CPU or microprocessor, graphics processing unit ("GPU"), and/or microcontroller. The present embodiments are not restricted by the architecture of the CPU 202 so long as the CPU 202, whether directly or indirectly, supports the operations as described herein. The CPU 202 may execute the various logical instructions according to the present embodiments.

The computer system 200 also may include random access memory (RAM) 208, which may be synchronous RAM (SRAM), dynamic RAM (DRAM), synchronous dynamic RANI (SDRAM), or the like. The computer system 200 may utilize RAM 208 to store the various data structures used by a software application. The computer system 200 may also include read only memory (ROM) 206 which may be PROM, EPROM, EEPROM, optical storage, or the like. The ROM may store configuration information for booting the computer system 200. The RAM 208 and the ROM 206 hold user and system data, and both the RAM 208 and the ROM 206 may be randomly accessed.

The computer system 200 also may include an input/output (I/O) adapter 210, a communications adapter 214, a user interface adapter 216, and a display adapter 222. The I/O adapter 210 and/or the user interface adapter 216 may, in certain embodiments, enable a user to interact with the computer system 200. In a further embodiment, the display adapter 222 may display a graphical user interface (GUI) associated with a software- or web-based application on a display device 224, such as a monitor or touch screen.

The I/O adapter 210 may couple one or more storage devices 212, such as one or more of a hard drive, a solid-state storage device, a flash drive, a compact disc (CD) drive, a floppy disk drive, and a tape drive, to the computer system 200. According to one embodiment, the data storage 212 may be a separate server coupled to the computer system 200 through a network connection to the I/O adapter 210. The communications adapter 214 may be adapted to couple the computer system 200 to the network 208, which may be one or more of a LAN, WAN, and/or the Internet. The communications adapter 214 may also be adapted to couple the computer system 200 to other networks such as a global positioning system (GPS) or a Bluetooth network. The user interface adapter 216 couples user input devices, such as a keyboard 220, a pointing device 218, and/or a touch screen (not shown) to the computer system 200. The keyboard 220 may be an on-screen keyboard displayed on a touch panel. Additional devices (not shown) such as a camera, microphone, video camera, accelerometer, compass, and or gyroscope may be coupled to the user interface adapter 216. The display adapter 222 may be driven by the CPU 202 to control the display on the display device 224. Any of the devices 202-222 may be physical and/or logical.

Figure 6:
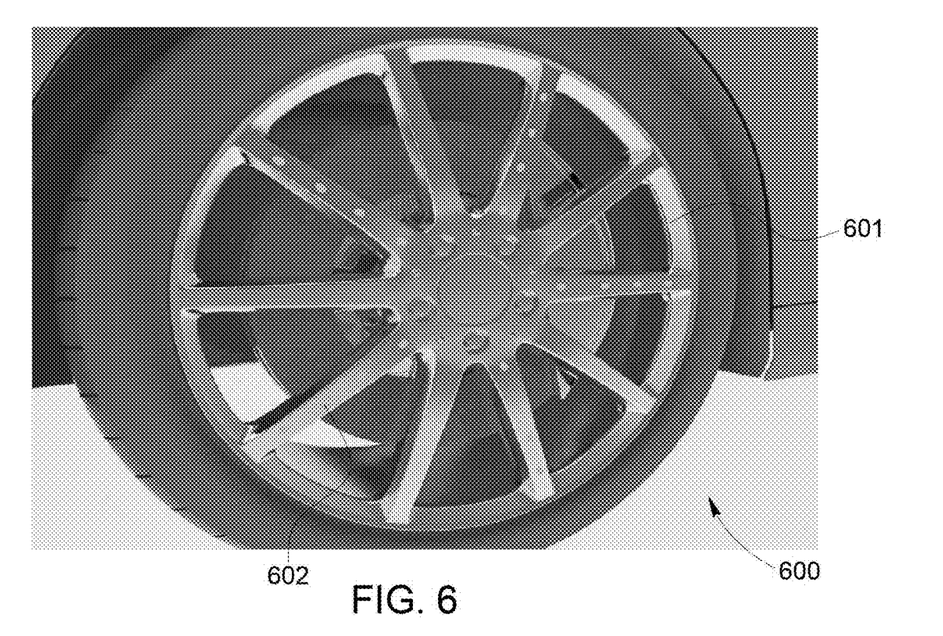
FIG. 6 illustrates an example of an embodiment of a tire with LED lights on the rim.

FIG. 6 illustrates an example of an embodiment of a tire with LED lights on the rim. The tire 600 has a rim 601 with LED lights 602 on it. The LED lights 602 are in a plurality of straight rows and can provide lights that blink and/or turn on and off. The lights 602 can change colors and can be used to provide visibility at night while work is being performed to the tire 600. For example, if the tire 600 is being filled with air from the outside at night, the lights 602 will provide visibility.

Figure 7:
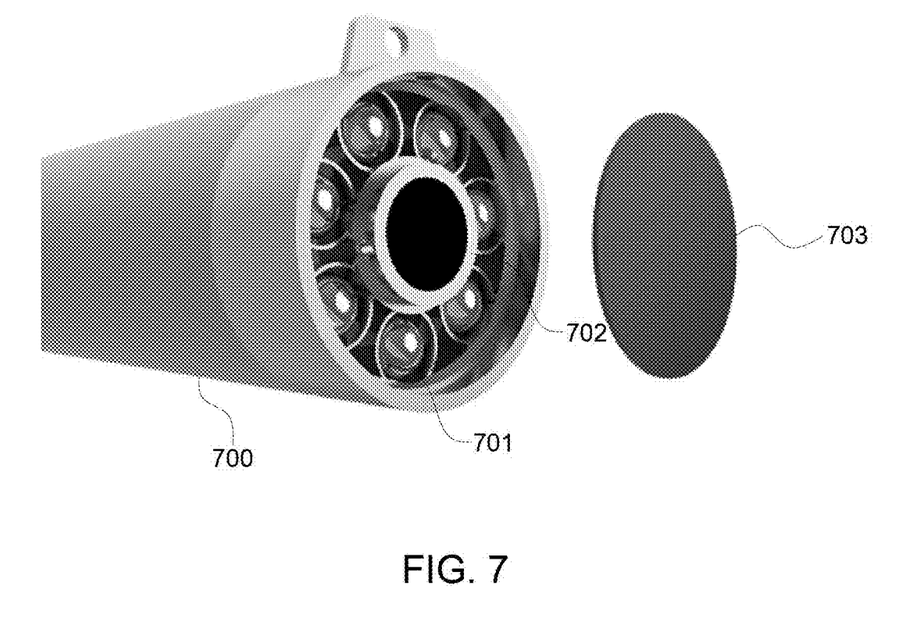
FIG. 7 illustrates an example of an embodiment of a wheel bearing with an aperture passing through the center of the bearing.

FIG. 7 illustrates an example of an embodiment of a wheel bearing with an aperture passing through the center of the bearing. The bearing 700 has a plurality of inside elements 701 that are able to turn while the housing of the bearing 700 stays fixed in one position. The plurality of inside elements 701 surround a central aperture 702 defined in the center of the housing of the bearing 700. This example embodiment also illustrates a rubber piece 703 that can be positioned over the top of the aperture 702.

Figure 8:
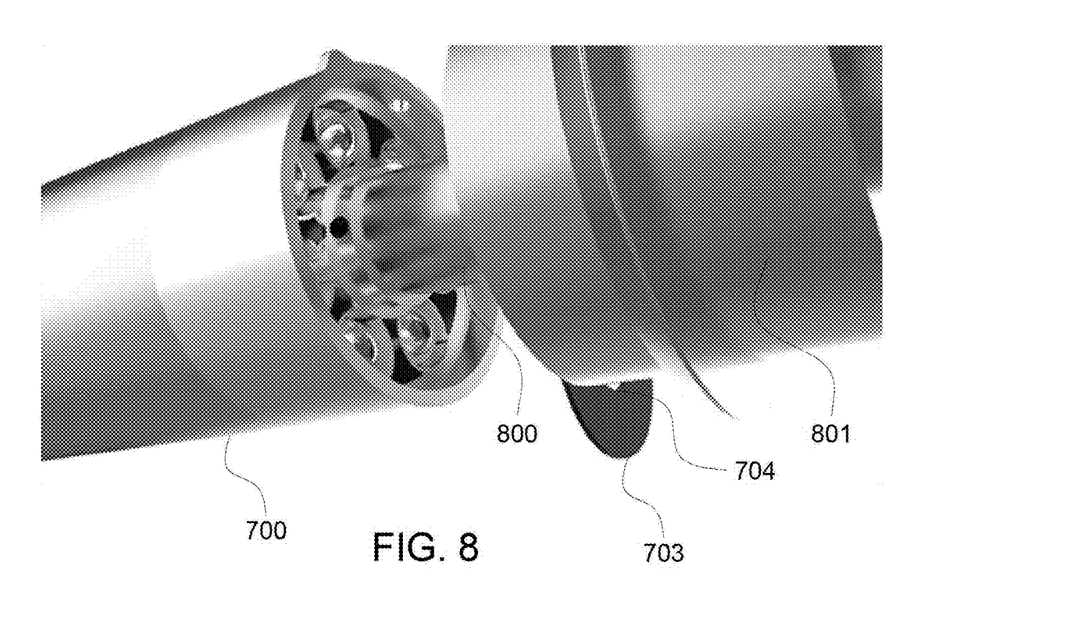
FIG. 8 illustrates an example of an embodiment of an axle connecting to the wheel bearing.

FIG. 8 illustrates an example of an embodiment of an axle connecting to the wheel bearing. The rubber piece 703 defines a central circle 704 for an air feed line 800 to pass through. In a preferred embodiment, the rubber piece 703 is positioned on top of the bearing 700. The air feed line 800 protrudes from the axle 801 and connects to the bearing 700 through the central circle 704 defined in the rubber piece 703. Air passes through the air feed line 800 from the axle 801.

Figure 9:
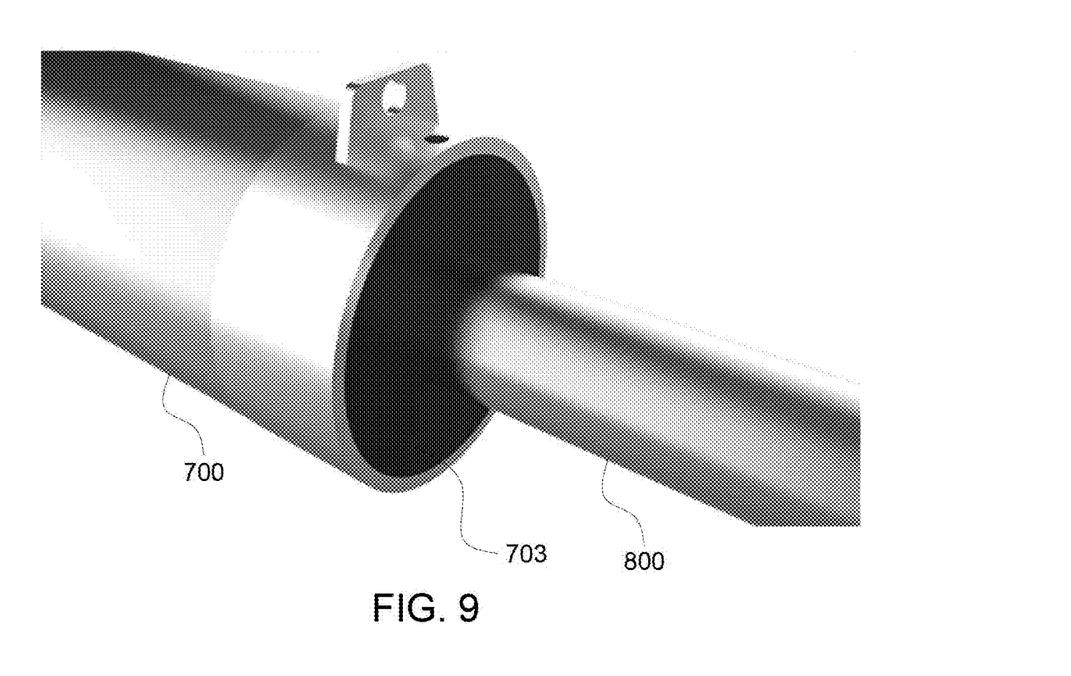
FIG. 9 illustrates an example of an embodiment of an air feed line connecting to the bearing through a hole in a rubber piece.

FIG. 9 illustrates an example of an embodiment of an air feed line connecting to the bearing through a hole in a rubber piece. In this example, the rubber piece 703 is positioned on top of the bearing 700, and the air feed line 800 connects to the bearing 700 through the rubber piece 703.

Figure 10:
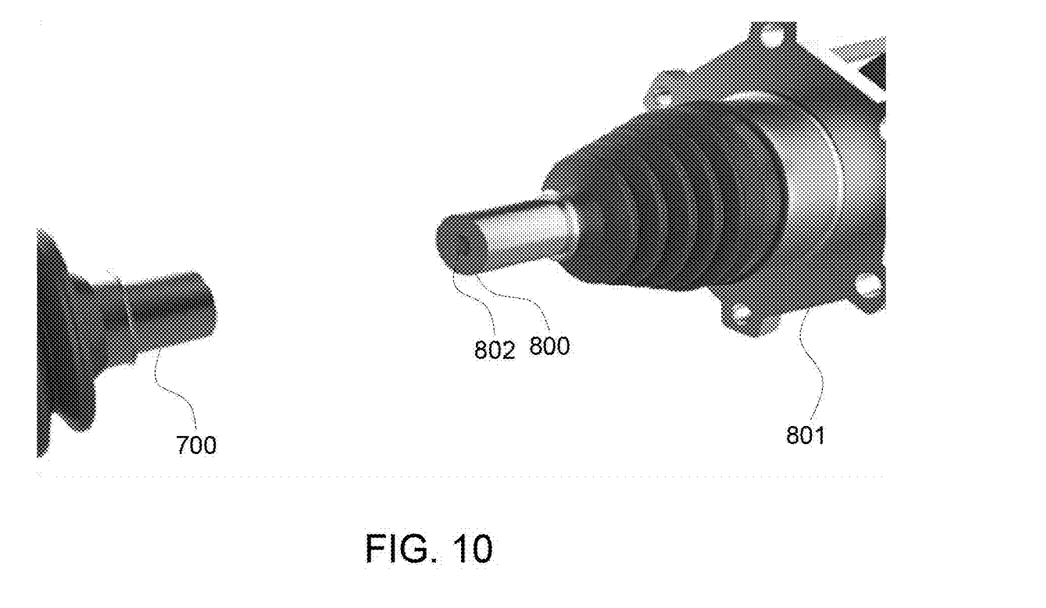
FIG. 10 illustrates partial cross sectional view of an example of an embodiment of a hole passing through the air feed line connected to the axle.

FIG. 10 illustrates a partial cross sectional view of an example of an embodiment of a hole passing through the air feed line connected to the axle. In this example, a cross sectional slice of the connection between the bearing 700 and the air feed line 800 is illustrated. In this example, the air feed line 800 protrudes from the axle 801, and a hole 802 is defined through the air feed line 800. Air passes through the hole 802 of the air feed line 800 from the axle 801 to the bearing 700.

Figure 11:
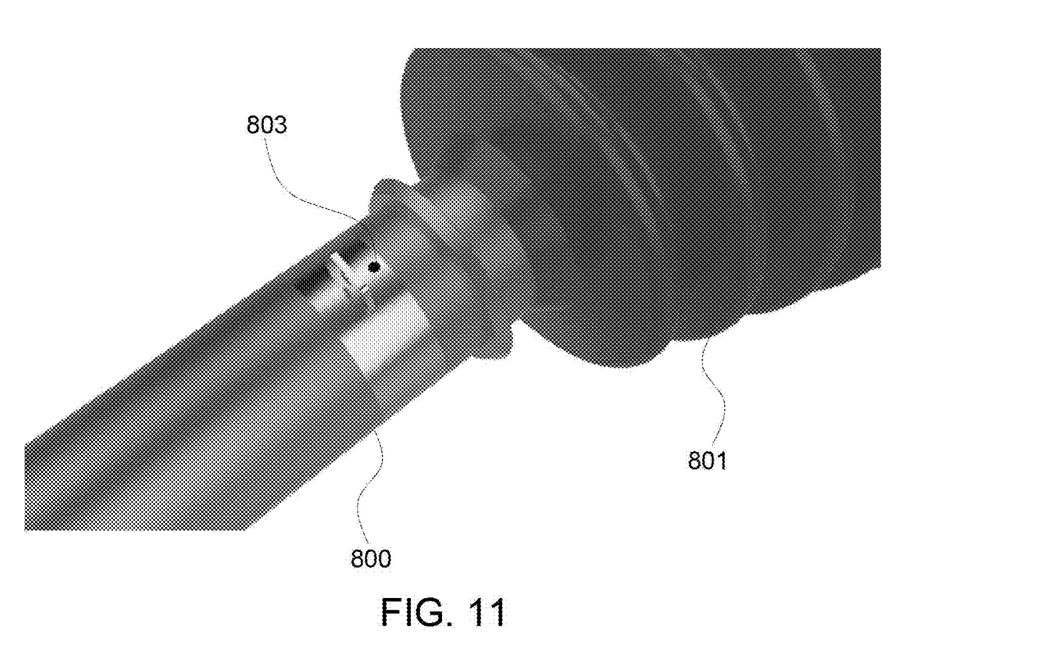
FIG. 11 illustrates an example of an embodiment of the connection between an axle and the air feed line.

FIG. 11 illustrates an example of an embodiment of the connection between an axle and the air feed line. The connection between the air feed line 800 and the axle 801 defines a small hole 803. The small hole 803 is where air is fed to the air feed line 800.

As demonstrated with regard to the embodiments of FIGS. 6-11, the applications of the present disclosure are not limited to the architecture of the computer system 200. Rather the computer system 200 is provided as an example of one type of computing device that may be adapted to perform the functions of a vehicle tire air pressure monitoring, warning, and maintenance system, including servers, personal computers, and mobile devices as shown in FIG. 3. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 200 may be virtualized for access by multiple users and/or applications.

Additionally, the embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A system for providing automatic vehicle tire air pressure monitoring, warning, and maintenance, a vehicle having a controller, four wheel rims having four tires coupled to four wheel hubs, and an air compressor configured to inflate each of the four tires, the system comprises:
   a pressure sensor contained within each wheel rim on a vehicle for measuring air pressure within a tire locates on each wheel rim;
   a compressor coupled to each of the four tire rims for providing pressurized air to each tire, the compressor having a standby state and an operating state;
   an air pressure line separately connecting the compressor to an air input valve in each of the four wheel rims;
   a driver display within the vehicle for providing warning to a driver; and
   a controller, the controller comprising:
      a memory having instructions stored thereon; and
      a processor configured to execute the instructions on the memory to cause the controller to:
      read an air pressure value corresponding to the air pressure within each tire; determine whether the air pressure value within each tire is below a predetermined value;
      when one or more of the air pressure values are below a pre-determined value, activate the compressor to separately add air to each of the four tires having the air pressure values below the pre-determined value;
      provide the driver a visual status of the air pressure values within in each of the tires and a visual status of the compressor state;
   one or more air feeders coupled to one or more of the air pressure lines each of the one or more of the air pressure lines being in communication with the compressor, the one or more air feeders accessible from an outside of the vehicle;
   an external air supply assembly removably attached to one of the one or more air feeders, the external air supply assembly comprising an air outlet coupled to an air hose connectable to one of the one or more air feeders, the external air supply assembly in communication with the compressor to obtain pressurized air from the compressor for inflating tires and other inflatable items not attached to the vehicle; and
   wherein each of the four tires are connect to a bearing, and each bearing is connected to a vehicle axle;
   each bearing comprising a housing, a plurality of interior elements and a central aperture, the plurality of interior elements able to turn while the bearing housing stays fixed in position;
   wherein one of the air pressure lines extends from the vehicle axle and connects to the bearing via the bearing central aperture, the bearing comprising a gasket with an opening through which the air pressure line passes;
   wherein air from the compressor may pass through the one of the air pressure lines, via the vehicle axle, into the bearing and in turn to the tire of each of the wheels.

2. The system according to claim 1, wherein the driver display provides a visual warning to the driver when one or more of the air pressure values measured for each of the four tires.

3. The system according to claim 2, wherein the driver display is further configured to provide an auditory warning with the visual warning to the driver when one or more of the air pressure values measured for each of the four tires indicating which of the four tires is in need of additional air pressure.

4. The system according to claim 1, wherein each of the tire rims comprise a wheel hub sensor for detecting a physical connection between the tire rim and the corresponding wheel hub.

5. The system according to claim 4, wherein the controller is further configured to execute the instructions to cause the controller to:
   read the wheel hub sensors; and
   when the controller detects the wheel hub sensors indicate that a wheel hub is separating from the corresponding wheel rim, provide the driver with a wheel rim separation warning indicating detection of one or more wheel hubs are separating from the corresponding wheel rim.

6. The system according to claim 5, wherein the wheel rim separation warning includes a visual separation warning and an auditory separation warning.

7. The system according to claim 1, wherein each of the four wheel rims comprise a plurality of LED lights.

8. The system according to claim 1 wherein an air feed line extends from each vehicle axle, the air feed line defining a small hole to which the air pressure line connects, the air feed line defining a central opening for air flow, and wherein the air feed line connects with the bearing central aperture.

* * * * *